Aug. 14, 1951 — L. H. BURNS — 2,564,463
WIRE CABLE CONNECTION
Filed Aug. 19, 1946
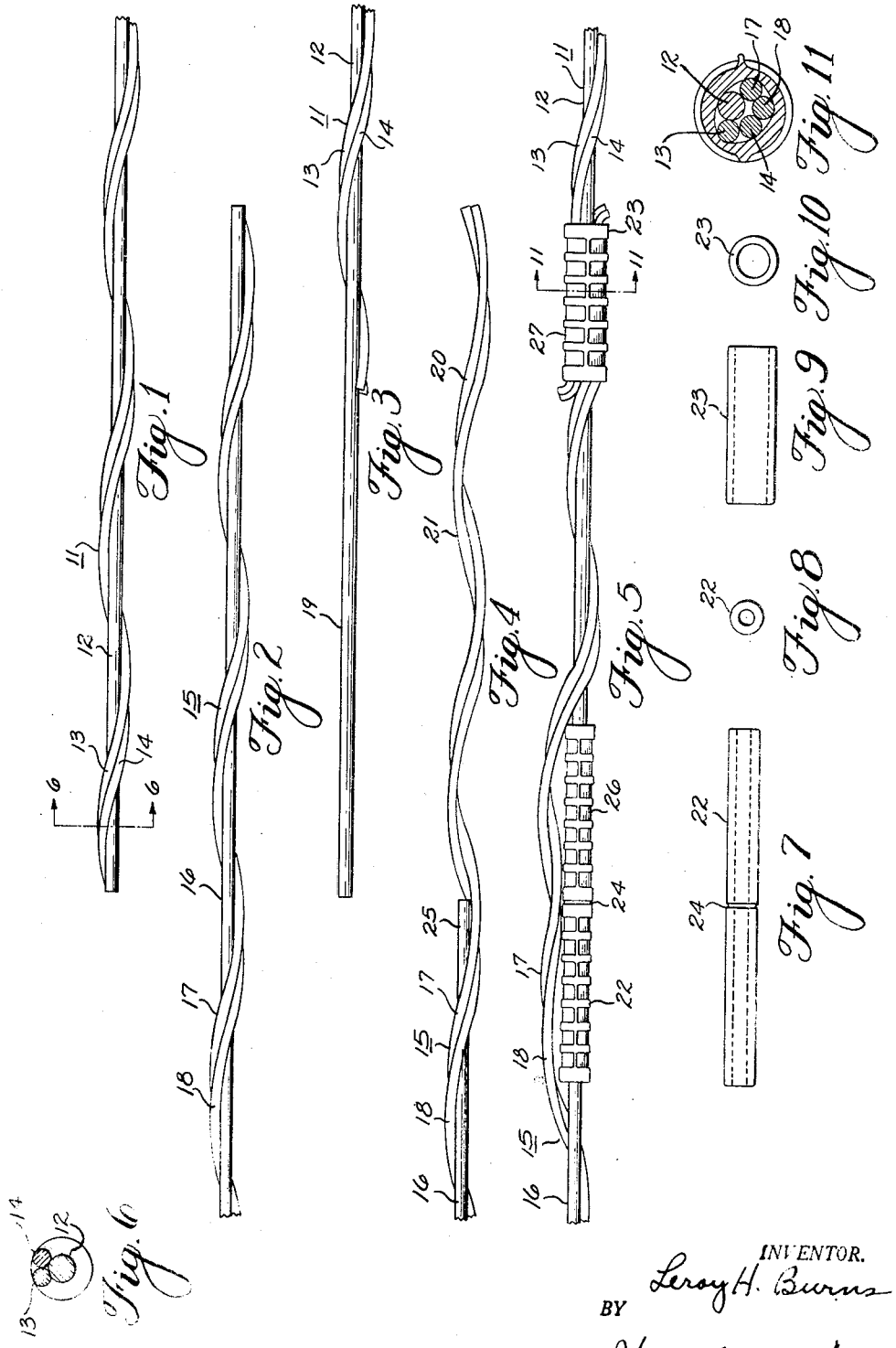
INVENTOR.
Leroy H. Burns
BY Hoodling and Krost
Attys.

Patented Aug. 14, 1951

2,564,463

UNITED STATES PATENT OFFICE 2,564,463

WIRE CABLE CONNECTION

Leroy H. Burns, Cleveland, Ohio, assignor to The National Telephone Supply Company, a corporation of Ohio Application August 19, 1946, Serial No. 691,492

3 Claims. (Cl. 174—42)

The invention relates in general to cable connections for joining the ends of cables and more particularly to wire cables having a wire core with a plurality of conductors wrapped thereabout.

An object of the invention is the provision of a connection for wire cables that joins the cores of the cables at a location separated from a connection joining the overlapping ends of the electrical conductors that are helically wrapped around the core.

Another object of the invention is the provision of a method for connecting wire cables, wherein the cores of the cables are connected at a first location and the ends of the electrical conductors that are helically wrapped around the core are overlapped upon the core and connected thereto at a second location.

A further object of the invention is the provision of a connection for the ends of the electrical conductors that are helically wrapped around the core of the cable, wherein a connecting sleeve is compressed upon the overlapped ends of the conductor with the core passing therethrough.

Another object of the invention is to provide an improved connecting device for wire cables of the overhead transmission type which connecting device is simple and inexpensive in its construction and use, and one which possesses not only the high tensile strength necessarily required of such a connection, but also the other characteristics required of a good electrical conductor.

Another object of the invention is to provide a cable connection in which the mass of the connection is distributed over an extended length of the cable so that the completed connection has a dampening effect upon the vibration set up by the wind.

A still further object of the invention is to provide a cable connection which maintains a high degree of concentricity in the connection with respect to the cable being connected.

Another object of the invention is to provide a cable connection that is simple to apply and economical to make.

Another object of the invention is to provide a cable connection that is fairly flexible with respect to the cable itself.

A still further object of the invention is to provide a cable connection wherein the dampening effect provided by the helically wrapped conductors is not materially lessened.

Other objects and a fuller understanding of the invention may be had by referring to the following description and claims, taken in conjunction with the accompanying drawing, in which:

Figure 1 is a plan view of an end of a cable to which the invention may be applied;

Figure 2 is a plan view of an end of another cable of similar type adapted to be connected to the cable shown in Figure 1;

Figure 3 is a view similar to Figure 1, with an end portion of the electrical conductors cut off preparatory for connection to another wire cable;

Figure 4 is a view similar to Figure 2, with an end portion of the high tensile strength core cut off preparatory to joining same with the wire cable shown in Figure 3;

Figure 5 shows the completed connection of the ends of the two cables;

Figure 6 is a cross-sectional view of the cable, taken along the line 6—6 of Figure 1;

Figure 7 is a plan view of a sleeve used to join the ends of the cores of the two wire cables;

Figure 8 is an end view of the sleeve shown in Figure 7;

Figure 9 is a plan view of a sleeve for joining the overlapping ends of the electrical conductors of the cables;

Figure 10 is an end view of the sleeve shown in Figure 9; and

Figure 11 shows an enlarged cross-sectional view taken on the line 11—11 of Figure 5.

The invention shall be described with particular reference to a cable having a high tensile strength core and a pair of high electrical conductivity conductors helically wrapped thereabout, although it will be readily understood that the invention is applicable to all types of wire cables. For the purpose of this invention, a cable shall be defined as any wire construction having a metal core with a plurality of other metal conductors wrapped thereabout, both the core and the conductors being either of solid or stranded construction. In general the invention comprises a core connecting sleeve 22 that joins the ends of the cores 12 and 16 of the two wire cables 11 and 15, and a conductor connecting sleeve 23 that connects the electrical conductors 13 and 14 of one cable with the electrical conductors 17 and 18 of the other cable and with the core 12 of the cable 11 passing therethrough.

In Figure 1 is shown the end of a wire cable 11 with a substantially straight core 12 and a pair of conductors 13 and 14 wrapped thereabout. This type of cable has found application in the field of overhead electric transmission lines and especially in rural electrification projects, where a wire cable must meet the combined requirements of high tensile strength and maximum economy consistent with good electrical conductivity. In consequence, the core is thereupon made of a high tensile strength material such as a steel alloy, and the conductors wrapped thereabout are of a material such as copper or aluminum or other conducting material which affords good electrical conductivity. In such a cable, the steel used for the core has a greater degree of elongation per unit of stress than has the electrical conductor. The entire cable upon being subjected to tension as is the case in overhead electric transmission lines, the steel core will elongate to a materially greater degree than the electrical conductors, but because of the nature of the construction of the electrical conductors about the core, which is a helical path around the core, the electrical conductors are not subjected to a greater tension than the electrical conductors can safely withstand. The wrapping of the electrical conductors about the core also dampens vibration of the cable. The connection means for joining the ends of two cables must then necessarily be designed to withstand at least as great a tensile stress as the cable itself, and must also possess equally good electrical conductivity characteristics.

With reference to the drawings, the Figures 1 and 2 show the ends of two wire cables 11 and 15 that are to be joined. The second wire cable 15 which is shown in Figure 2, is substantially identical to the first wire cable 11 in Figure 1. The wire cable 15 has a core member 16 and a pair of electrical conductors 17 and 18. In joining the cables, the end of the first wire cable 11 is prepared for connection by cutting away a portion of the electrical conductors 13 and 14 leaving an exposed portion 19 of the core 12, as shown in Figure 3. The end of the second wire cable 15 is prepared by cutting away a portion of the core 16, leaving exposed portions 20 and 21 of the electrical conductors 17 and 18. As shown in Figure 4, the exposed portions 20 and 21 of the electrical conductors 17 and 18 are of greater length than the exposed portion 19 of the core 12 shown in Figure 3. The core connecting sleeve 22 and the conductor connecting sleeve 23 as shown in Figures 7 and 9 respectively, are used to make the finished connection. The conductor connecting sleeve 23 is first slipped over the exposed end 19 of the wire cable 11, and pushed on back over the electrical conductors 13 and 14 where it will be out of the way for the next operation. The core connecting sleeve 22 is next pushed onto the end of the exposed portion 19 of the core 12 of the wire cable 11 until the end of the exposed portion 19 reaches an internal shoulder provided by depressing a circumferential groove 24 around the sleeve midway of the core connecting sleeve 22. The exposed portions 20 and 21 of the electrical conductors 17 and 18 of the wire cable 15 are next partially unwrapped and sprung out of the way to permit the end portion 25 of the core 16 to be exposed. The end portion 25 is next inserted into the other end of the core connecting sleeve 22 until it is stopped by the internal shoulder provided therein. The core connecting sleeve 22, as illustrated, is a compression type sleeve wherein connection between the sleeve and the core is effected by compressing the sleeve upon the core, which may be done by any suitable compression type tool. For purposes of illustration the sleeve has been shown as compressed by a compression type tool which has caused radially inwardly compressed portions 26, as shown in Figure 5, which cause the core to be firmly gripped by the sleeve 22.

In the preparing the ends of the cables 11 and 15 for connection, the exposed portions 20 and 21 of the electrical conductors 17 and 18 are purposely made longer than the exposed portion 19 of the core 12 of the wire cable 11. This is done so that in making the connection, the electrical conductors of the two cables 11 and 15 would overlap. To make the connection between the electrical conductors, the exposed portions 20 and 21 of the electrical conductors 17 and 18 are wrapped about the completed core connecting sleeve 22, then wrapped about the remaining exposed portion 19 of the core 12, and overlap upon the ends of the electrical conductors 13 and 14 thereby producing an overlapping section to receive the conductor connecting sleeve 23. The conductor connecting sleeve 23 is next slipped over the overlapping section of the electrical conductors 20 and 21 of the cable 15 and conductors 13 and 14 of cable 11. The conductor connecting sleeve 23 is roughly centered upon this overlapping section. The conductor connecting sleeve 23 may then be compressed upon the overlapping section so as to cause a firm engagement between the sleeve 23, the electrical conductors 13, 14, 20 and 21, and the core 12 which passes therethrough. For purposes of illustration, the conductor connecting sleeve 23 has again been shown as having been compressed by a compression tool which has caused radially inwardly upset portions 27, as shown in Figure 5. The ends of the electrical conductors 13, 14, 20 and 21, may then be bent away from the cable 11 and cut off to make the finished connection is shown in Figure 5.

The cable as hereinbefore described, has a steel core and a pair of copper conductors. In actual practice the wires of the cable are galvanized to deter corrosion. Preferably, the connecting sleeve used in any particular instance is of the same material as the wire with which it is used. Thus a steel connecting sleeve is used with a steel core, and a copper or aluminum sleeve is used with a copper or aluminum conductor, respectively. The connecting sleeves are preferably galvanized or otherwise coated with zinc or other metal fairly high in the electrochemical series. So coating the sleeves, in conjunction with the galvanized cable, materially prevents electrochemical corrosion. Upon cutting off the end of the electrical conductors near the conductor connecting sleeve 23 to make the finished connection, the metal of the conductor, such as copper or aluminum is exposed to the atmosphere. Therefore an important reason for bending the conductors away from the conductor connecting sleeve 23 is to separate the exposed metal of the conductor from the cable connection. The separation will materially aid in preventing electrochemical corrosive action at this point.

The completed connection as shown in Figure 5 accomplishes the purpose of providing a good mechanical connection between the cores 12 and 16, so as to withstand the tensile stress, and a good electrical connection is made between the electrical conductors at the conductor connecting sleeve 23. A cross-sectional view of the completed connection at the conductor connecting sleeve 23 taken on the line 11—11 of Figure 5, is shown at Figure 11 which shows the core 12 and electrical conductors 13 and 14 of the wire cable 11 being overlapped by the electrical conductors 20 and 21 of the wire cable 15. This cross-sectional view shows how the conductor connecting sleeve 23 in being compressed upon the electrical conductors makes a good electrical connection between the sleeve and the conductors, and also a firm contact between the conductors and the core 12.

In the completed connection, the core connecting sleeve 22 is relatively near the conductor connecting sleeve 23, which might be a distance of four to twelve or more inches. The spacing between the two sleeves 22 and 23 is preferably of such a distance that at least one substantially complete wrap or pitch of the conductor wires is present between them. Thus the core wire is helically supported between the sleeves 22 and 23. This spacing of the sleeves has the effect of extending the mass of the connection over a greater distance, and the dampening effect of the cable is not materially lessened. The cable, in having the conductors helically wrapped thereabout, provides, a dampening effect to the vibrations caused by the wind. In the invention, the conductors are maintained in substantially the same relation at the connection, and the dampening effect is not materially lessened. The completed connection, having only two sleeves, is therefore simple to apply and economical to make and use. The connection is simple to apply, because in making the first connection of the core connecting sleeve 22, the conductors are easily sprung out of the way, permitting free access to the sleeve by the compression tool. In making the connection of the conductor connecting sleeve 23, the compression tool again has free access to the sleeve because the core passes through the sleeve.

Because the conductor connecting sleeve 23 has the core 12 passing therethrough, a high degree of concentricity is maintained in the connection. With two sleeves spaced apart, a high degree of flexibility is also maintained in the connection. The two sleeve construction of the connection serves the function of giving a good mechanical high-stress connection at the core connecting sleeve 22, and a good electrical conductivity, as well as strong, connection at the conductor connecting sleeve 23.

The conductor connecting sleeve also serves the function of securing the conductors to the core of the cable at this completed connection, so that there is no slippage between the conductors and core at this point. The conductor connecting sleeve 23 provides the necessary electrical conductivity at the completed connection, which sleeve also has sufficient strength to withstand whatever tensile stress the conductors of the cable are subjected and thus aid to reduce the continuing stress to which the core would otherwise be subjected. The characterization that the ends of the conductor wire overlap each other, is to be interpreted that the wires are longitudinally extensive with respect to each other for a portion of their length, thereby producing a longitudinally overextending section or relationship between the conductor wires.

Although I have described my invention in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A connecting structure for joining the ends of two wire cables each having a high tensile strength core and a plurality of electrical conductors helically wrapped thereabout, said connecting structure comprising a first connecting sleeve joining the ends of the cores of said cables at a first location, said electrical conductors of one cable having an end portion helically wrapped about said first connecting sleeve and overlapping upon the ends of the electrical conductors of the other cable at a second location, and a second connecting sleeve joining said overlapped conductors at said second location with said core passing therethrough.

2. A connecting structure for joining the ends of two wire cables each having a high tensile strength core and a pair of electrical conductors wrapped around said core in side-by-side relation, said connecting structure comprising, a first connecting sleeve joining the ends of the cores of said cables in substantially axial alignment at a first location, said electrical conductors of one cable having an end portion wrapped about said first connecting sleeve and overlapping upon the ends of the electrical conductors of the other cable at a second location, and a second connecting sleeve joining said overlapped conductors at said second location with said core passing therethrough.

3. A connecting structure for joining the ends of two wire cables each having a core and a plurality of wires wrapped thereabout, said connecting structure comprising a first connecting sleeve joining the ends of the cores of said cables at a first location, said wires of one cable having an end portion disposed alongside of and extending beyond said first connecting sleeve and overlapping upon the ends of the wires of the other cable at a second location, and a second connecting sleeve joining said overlapped wires at said second location with said core passing therethrough.

LEROY H. BURNS.

REFERENCES CITED

The following references are of record in the file of this patent:

UNITED STATES PATENTS

| Number | Name | Date |
| --- | --- | --- |
| 1,654,788 | Channell | Jan. 3, 1928 |
| 1,813,562 | Channell | July 7, 1931 |
| 1,855,340 | Damon | Apr. 26, 1932 |
| 2,038,535 | Brenizer | Apr. 28, 1936 |
| 2,062,986 | Baxter | Dec. 1, 1936 |
| 2,182,342 | Karitsky | Dec. 5, 1939 |
| 2,327,651 | Klein | Aug. 24, 1943 |

FOREIGN PATENTS

| Number | Country | Date |
| --- | --- | --- |
| 361,149 | Italy | July 14, 1938 |